M. DE ARRIGUNAGA.

AUXILIARY STEERING DEVICE.

APPLICATION FILED JUNE 25, 1917.

Reissued Sept. 4, 1917.

14,348.

2 SHEETS—SHEET 1.

INVENTOR

Manuel de Arrigunaga

BY

Kingsford Kingsford, his ATTORNEYS

M. DE ARRIGUNAGA.

AUXILIARY STEERING DEVICE.

APPLICATION FILED JUNE 25, 1917.

Reissued Sept. 4, 1917.

14,348.

2 SHEETS—SHEET 2.

INVENTOR

Manuel de Arrigunaga

BY

Kenyon & Kenyon his ATTORNEYS

UNITED STATES PATENT OFFICE.

MANUEL DE ARRIGUNAGA, OF NEW YORK, N. Y.

AUXILIARY STEERING DEVICE.

14,348. Specification of Reissued Letters Patent. Reissued Sept. 4, 1917.

Original No. 1,183,278, dated May 16, 1916, Serial No. 68,139, filed December 22, 1915. Application for reissue filed June 25, 1917. Serial No. 176,780.

*To all whom it may concern:*

Be it known that I, MANUEL DE ARRIGUNAGA, a citizen of the Republic of Mexico, formerly residing in Merida, in the State of Yucatan and Republic of Mexico, but now residing in the borough of Manhattan, in the city, county, and State of New York, have invented certain new and useful Improvements in Auxiliary Steering Devices, of which the following is a specification.

My invention relates to certain improvements in steering devices for vehicles, as for example, automobiles, by the use of supplementary wheels attached to the forward and rear portions of the vehicle, with apparatus to throw same into, and out of, action.

When the vehicle is in a narrow street or roadway, the driver is obliged to make a series of forward and backward movements of the vehicle with considerable inconvenience and loss of time, in order to accomplish the necessary swinging about of the vehicle to enable same to move in an opposite direction.

The objects of my invention are, among other things, to provide a simple and efficient device, together with means for operating same, whereby the customary inconvenience and difficulty in securing a complete rotation of the vehicle are, to a large extent, obviated.

I have illustrated my improved device as applied to the front portion of an automobile in connection with the steering mechanism for the two front wheels of such automobile, but it is obvious that other types of vehicles may be equipped with my improved auxiliary steering device.

Figure 1:
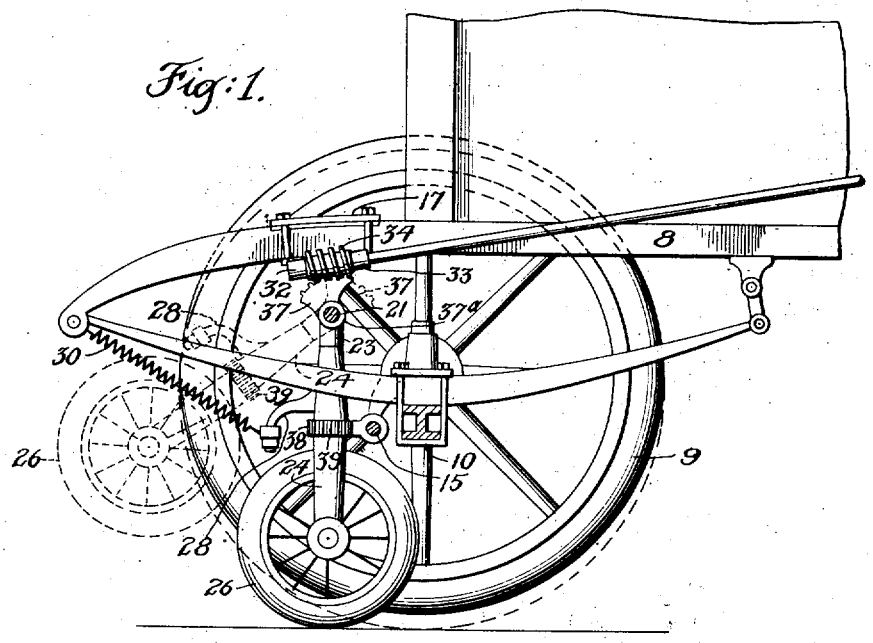
Figure 3:
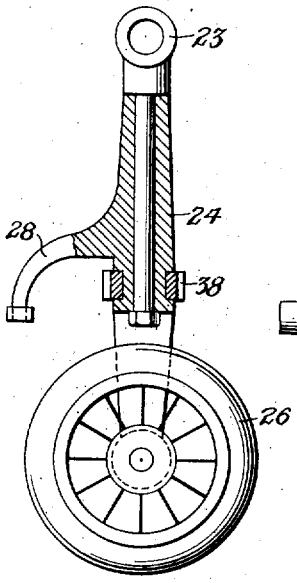
Figure 2:
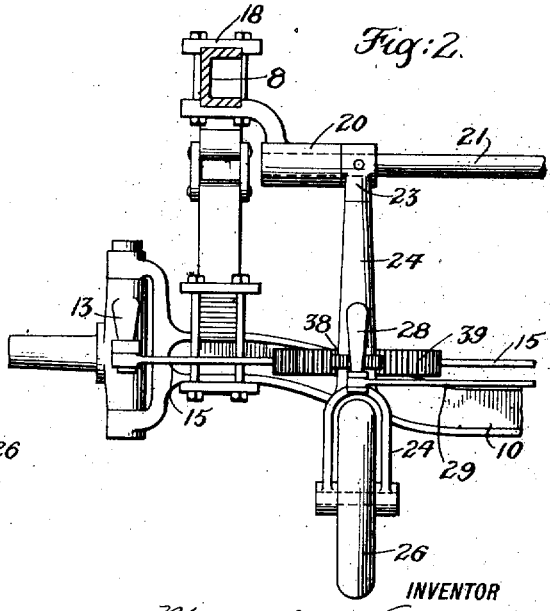
Figure 4:
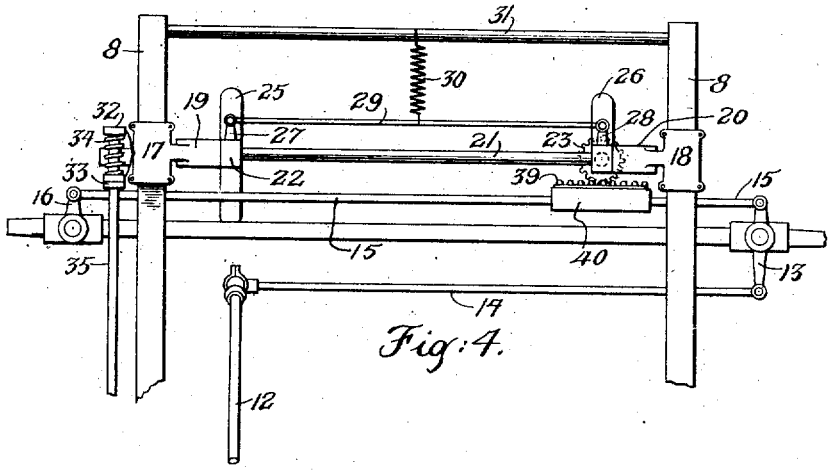
Figure 5:
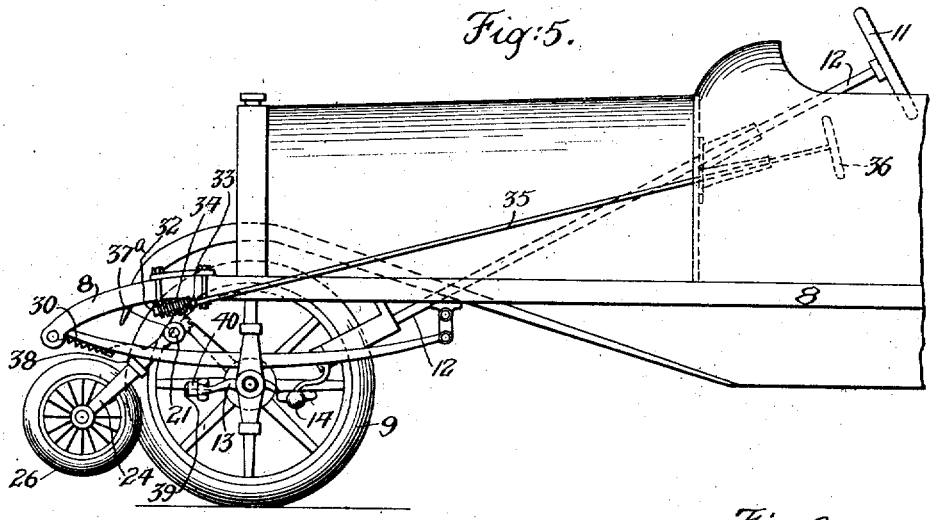
Figure 7:
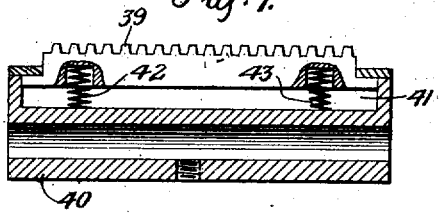
Figure 6:
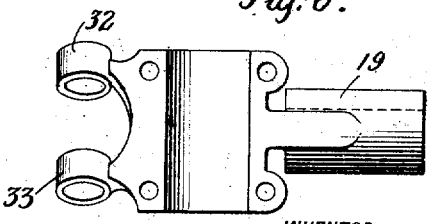

In the accompanying drawings, Figure 1 is a side elevation view partly in section of an automobile provided with my improved auxiliary steering device; Fig. 2 is an enlarged fragmentary front view of the right side of the automobile; Fig. 3 is an enlarged vertical sectional view of the support for one of the auxiliary steering wheels; Fig. 4 is a top plan view of the front end of the automobile, equipped with my device, the main front wheels of the automobile being omitted; Fig. 5 is a diagrammatic side view of the front end of the automobile, one wheel being omitted, showing a mechanism for operating the auxiliary steering wheels; Fig. 6 is an enlarged plan view of one form of support for the worm gear for operating the auxiliary steering wheels; and Fig. 7 is a sectional plan view showing the yieldingly supported rack for turning these auxiliary steering wheels.

Similar numerals refer to similar parts throughout the several figures.

Referring to the drawings, 8 indicates the frame-work of an automobile of the usual type, having one of the main front wheels 9 rotating on the front axle 10. The front wheels are turned in either direction from the steering wheel 11 mounted on the steering post 12, connected to the lever arm 13 by the rod 14, to operate both wheels through the connecting bar 15 attached to the arm 16, as shown in Figs. 4 and 5. This is a well known and common form of construction in automobiles to accomplish the steering through a joint sidewise movement of the front wheels, and need not be further described, as it constitutes no part of my present invention in itself.

Secured to the frame 8 on either side of the vehicle are the brackets 17 and 18, each having inwardly projecting arms 19 and 20 respectively carrying the transverse shaft 21. Journaled to the shaft 21 are two depending rods 22 and 23, each having rotatably secured thereto a forked frame 24 (only one being shown) which rotatably carries within its forked portion the auxiliary wheels 25 and 26 of smaller size than the front wheels 9. Each frame 24 has forwardly projecting arms 27 and 28 connected by the rod 29. The coil spring 30 connecting the rod 29 to the rod 31 secured to the front of the frame 8, as shown in Fig. 4, normally holds the auxiliary wheels 25 and 26 lifted off the ground, as shown in Fig. 5 and in dotted lines in Fig. 1.

The forked frames 24 with their wheels 25 and 26 are so constructed with relation to the front wheels of the automobile, that when the frames are forced downwardly into vertical position, as shown in Fig. 1, the wheels 25 and 26 bear on the roadway, and the main wheels 9 are lifted off the surface of the road, the frame of the automobile being slightly tilted upwardly thereby.

The outwardly projecting lugs 32 and 33 of the bracket 17 carry the worm gear 34, mounted on the shaft 35, extending within the body of the automobile to be rotated by the hand-wheel 36, as shown in Fig. 5. Suitable mechanism may be employed to operatively connect the shaft 35 with the motor shaft of the automobile to rotate the former when required; for sake of clearness and simplicity I have shown the shaft 35 operable through the hand-wheel 36. The worm gear 34 is arranged so as to enmesh with the geared sector 37, secured to the sleeve 37[a], journaled on the shaft 21, which sleeve is secured in turn to the depending rod 22 which carries the forked frame 24. The operation of the worm gear 34 through the geared sector 37 will raise or lower in a substantially vertical plane, the pair of auxiliary wheels 25 and 26, such movement being under the control of the operator.

The forked frame 24 carrying the left auxiliary wheel 26, as shown in Figs. 1 and 4, has secured thereto the pinion 38, adapted to engage the rack 39 mounted on the block 40, which is secured to the bar 15, controlling the sidewise movements of the two main front wheels of the automobile. As shown in Fig. 7, the rack 39 is yieldingly held in a side opening 41 formed in the block 40 by means of the coil springs 42 and 43. This form of construction enables the rack 39 to oscillate slightly so as to always enmesh with the teeth in the pinion 38, under all conditions of movements of the automobile due to unevenness in the roadway or from other causes, and from the operation of the steering mechanism. By this arrangement, I am able to increase and control the sidewise movement of the auxiliary wheels 25 and 26 in either direction through the steering wheel 11, since the size of the pinion 38 is such that when the bar 15 moves between its extreme positions to the right or to the left, the rack 39 operates the pinion 38 so that the auxiliary wheels 25 and 26 make a greater rotation or sharper turn than would be possible for the main front wheels when actuated directly by the steering wheel 11. My improved auxiliary device may be also utilized to support the automobile when repairing or replacing the tires to the front wheels, and may also be attached to the rear portion of the car to be used in the garage in connection with the forward wheels 25 and 26, to raise the automobile clear of the four main running wheels, the four supplementary wheels sustaining the dead weight of the car.

The manner of operating my device is substantially as follows: When the chauffeur desires to make a sharp turn or make a full swing of the car in a narrow street or roadway, he turns the hand wheel 36, which rotates the shaft 35 and worm gear 34, to lower into vertical position the forked frames carrying the auxiliary wheels 25 and 26, thereby placing same on the roadway and lifting the two front wheels 9 slightly above the roadway, as shown in full lines in Fig. 1. When the wheels 25 and 26 are in working position, the last tooth of the geared sector 37 remains within or inside of the worm gear 34, as shown in Fig. 1; when the wheels 25 and 26 are in vertical position the pinion 38 enmeshes with the rack 39, and such wheels may be turned in unison through the transverse movement in either direction of the bar 15, operated by the steering wheel 11. The size of the plane surface of the rack 39, and its yielding support in the block 40, maintains the pinion 38 and rack 39 in mesh, no matter what may be the position of the wheels 25 and 26, due to their turning or the unevenness of the roadway, or from other causes. As hereinbefore described, the pinion 38, on account of its small diameter, may, on being rotated by the rack 39, determine that the auxiliary wheels 25 and 26 shall make a sharper turn than would be possible for the main front wheels 9, thereby enabling the chauffeur to make a full turn or swing of the car in a narrow street or roadway. In lieu of the wheel 36, the chauffeur may inaugurate the operation of suitable mechanism to connect the shaft 35 with the main shaft of the motor in the automobile to rotate the shaft 35 and worm gear 34 to throw my auxiliary steering device into action.

My invention, in its broadest aspects, is not to be confined to the particular constructions herein shown and described, since many changes may be made in the structural parts without departing from the main principles of the invention, and without sacrificing its chief advantages.

Having thus described my invention, what I claim as new and desire to secure by Letters Patent, is:

1. In a motor vehicle, the combination with steering means connected with the main front wheels of the vehicle, of a normally raised auxiliary steering device including a small road-wheel adapted to be lowered to the ground to raise the forward part of the vehicle and having an upright axis about which it turns for steering the vehicle, means for effecting the lowering and raising of said small wheel, and means for connecting said small wheel and said steering means, said connecting means including a gear operatively connected with the wheel to turn therewith about said axis and a rack geared to said gear to turn the same and the wheel about said axis, said connecting means allowing said small wheel under the control of said steering means to be more sharply turned than the main front wheels.

2. In a motor vehicle, the combination with steering means connected with the main front wheels, of a pair of normally raised relatively small, spaced auxiliary road-wheels mounted on the vehicle and adapted to be lowered to the roadway to raise the forward part of the vehicle and to also be raised, means for effecting said lowering and raising of the auxiliary wheels, a separate upright axis for each of said auxiliary wheels about which the wheels are swung to steer the car when the wheels are lowered to the roadway, and means for connecting said auxiliary wheels with said steering means to turn the car more sharply than it would have been turned by the main front wheels.

3. In a motor vehicle, the combination with steering means connected with the main front wheels of the vehicle, of a normally raised auxiliary steering device including a small road-wheel mounted on the vehicle and adapted to be swung up and down so as to be lifted off of and lowered to the roadway to raise the forward part of the vehicle, means for effecting said lowering movement of the auxiliary wheel, said means comprising a gear operatively connected with the wheel and a rotatable shaft geared to the same for driving the gear to lower said wheel, an upright axis about which the wheel turns for steering the vehicle, and means for connecting said small wheel and said steering means, said connecting means including a gear operatively connected to the wheel to turn therewith about said upright axis and a rack geared to said gear to turn said gear and wheel about said axis, said connecting means allowing the small wheel under the control of the steering means to be more sharply turned than the main front wheels.

4. In a motor vehicle, the combination with steering means connected with the main front wheels, of a pair of normally raised relatively small, spaced auxiliary road-wheels mounted on the vehicle and adapted to be swung vertically so as to be lifted off of and lowered to the roadway to raise the forward part of the vehicle, means for effecting said vertical swinging movement of the auxiliary wheels, a separate upright axis for each of said auxiliary wheels about which the wheels are swung to steer the car when the wheels are lowered to the roadway, and means for connecting said auxiliary wheels with said steering means to turn the car more sharply than it could have been turned by the main front wheels.

5. In a motor vehicle, the combination with steering means connected with the main front wheels, of a pair of normally raised relatively small, spaced auxiliary road-wheels adapted to be lowered to the roadway to raise the main front wheels of the vehicle, frames adapted to turn horizontally about vertical axes one for each of said auxiliary wheels on which the wheel is rotatively mounted and secured to turn therewith, arms journaled on the vehicle to swing vertically and each having one of said horizontally turning frames secured to its free end to swing therewith, means for effecting the vertical swinging movement of said arms to raise and lower the wheels, said means comprising a worm gear sector movable with the arms and a worm meshing with the same to swing it, means for connecting said horizontally turning frames and said steering means when said auxiliary wheels are lowered to the roadway, to cause the vehicle to be turned by said auxiliary wheels under the control of said steering means and at a sharper angle than the vehicle could be turned with the main front wheels, said connecting means including a pinion mounted on one of said horizontally turning frames and a rack meshing therewith and operated by said steering means.

6. In a motor vehicle, the combination of a pair of relatively small auxiliary steering wheels spaced a substantial distance apart, one near each side of the car, horizontally turning frames one for each of said auxiliary wheels on which the wheel is rotatably mounted and secured to turn therewith, arms mounted on the vehicles to swing vertically and each having one of said horizontally turning frames secured to its free end to swing therewith, means for effecting the vertical swinging movement of said arms to raise and lower the wheels, and means for turning said auxiliary wheels when on the ground, to turn the car, said means comprising a pinion on one of said horizontally turning frames and a rack meshing therewith and having means for operating it under the control of the driver, whereby the vehicle may be turned at a sharper angle than with the main front wheels.

7. In a vehicle, the combination with steering means therefor, of an auxiliary steering device comprising rotary means arranged to be lowered to the roadway to raise the forepart of the vehicle on said rotary means, means for lowering said rotary means, and yielding means connecting said rotary means with said steering means to turn said rotary means by said steering means.

8. In a vehicle, the combination with steering means therefor, of an auxiliary steering device comprising a pair of supplementary wheels arranged to be lowered to the roadway to raise the forepart of the vehicle on said supplementary wheels, means for lowering said supplementary wheels, and yielding means connecting said supplementary wheels with said steering means to turn said supplementary wheels by said steering means.

9. In a vehicle, the combination with steering means therefor, of an auxiliary steering device comprising a pair of supplementary wheels arranged to be lowered to the roadway to raise the forepart of the vehicle on said supplementary wheels, means for lowering said supplementary wheels, and yielding means connecting said supplementary wheels with said steering means to turn said supplementary wheels by said steering means, said wheels turning in unison.

10. In a vehicle, the combination with steering means connected with the main front wheels, of an auxiliary steering device comprising a pair of supplementary wheels mounted on the vehicle forward the axle of the front wheels, means for securing vertical swinging and horizontal turning movements for said supplementary wheels, means to lower said supplementary wheels to the roadway whereby the main front wheels are raised from the roadway, and yielding means connecting said supplementary wheels with said steering means to horizontally turn said supplementary wheels in unison by said steering means.

11. In a vehicle, the combination with steering means connected with the main front wheels, of an auxiliary steering device comprising a pair of supplementary wheels mounted on the vehicle forward the axle of the front wheels, means for securing vertical swinging and horizontal turning movements for said supplementary wheels, means comprising a worm gear and enmeshing geared sector device to lower said supplementary wheels to the roadway whereby the main front wheels are raised from the roadway, and means comprising a sliding rack engaging with a pinion on said supplementary wheel securing means connected with said steering means to horizontally turn said supplementary wheels in unison, at will.

12. In a vehicle, the combination with steering means connected with the main front wheels, of an auxiliary steering device having a transverse shaft secured to the vehicle forward the front wheel axle, a pair of vertically swinging, horizontally turning, frames journaled to said shaft, a supporting wheel rotatably secured in each frame, means comprising a worm gear and enmeshing geared sector device to lower said supporting wheels to a vertical position to engage the roadway whereby the main front wheels are raised from said roadway, and means connected with said steering means to horizontally turn said frames in unison at a greater angle than said main front wheels.

13. In a vehicle, the combination with steering means connected with the main front wheels, of an auxiliary steering device having a transverse shaft secured to the vehicle forward the front wheel axle, a pair of vertically swinging, horizontally turning, frames journaled to said shaft, a supporting wheel rotatably secured in each frame, means comprising a worm gear and enmeshing geared sector device to lower said supporting wheels to a vertical position to engage the roadway whereby the main front wheels are raised from said roadway, and means comprising a sliding rack engaging a pinion secured to one of said frames, connected with said steering means to horizontally turn said frames in unison at a greater angle than said main front wheels.

In testimony whereof I have signed my name to this specification.

MANUEL DE ARRIGUNAGA.

Copies of this patent may be obtained for five cents each, by addressing the "Commissioner of Patents, Washington, D. C."